United States Patent [19]

Kimura

[11] Patent Number: 4,941,737
[45] Date of Patent: Jul. 17, 1990

[54] LIQUID-CRYSTAL DISPLAY DEVICE USING TWISTED NEMATIC LIQUID CRYSTAL MOLECULES

[75] Inventor: Naofumi Kimura, Nara, Japan
[73] Assignee: Sharp Kabushiki Kaisha, Osaka, Japan
[21] Appl. No.: 254,042
[22] Filed: Oct. 6, 1988
[30] Foreign Application Priority Data
   Oct. 7, 1987 [JP] Japan ............................. 62-253278
[51] Int. Cl.⁵ .............................................. G02F 1/13
[52] U.S. Cl. .................................. 350/335; 350/347 E
[58] Field of Search ............ 350/335, 340, 341, 347 E, 350/347 V

[56] References Cited

U.S. PATENT DOCUMENTS

| | | | |
|---|---|---|---|
| 4,375,317 | 3/1983 | Funada et al. | 350/335 |
| 4,408,839 | 10/1983 | Wiener-Avnear | 350/335 X |
| 4,436,379 | 3/1984 | Funada et al. | 350/335 X |
| 4,443,065 | 4/1984 | Funada et al. | 350/335 |
| 4,448,489 | 5/1984 | Sato et al. | 350/335 X |
| 4,596,446 | 6/1986 | Waters et al. | 350/341 X |
| 4,610,507 | 9/1986 | Kamamori et al. | 350/335 |
| 4,634,229 | 1/1987 | Amstutz et al. | 350/346 |
| 4,697,884 | 10/1987 | Amstutz et al. | 350/341 X |
| 4,779,960 | 10/1988 | Kozaki et al. | 350/341 X |
| 4,815,825 | 3/1989 | Nakagomi et al. | 350/347 E X |
| 4,844,569 | 7/1989 | Wada et al. | 350/347 E |

FOREIGN PATENT DOCUMENTS

| | | |
|---|---|---|
| 0131216 | 1/1985 | European Pat. Off. . |
| 0006218 | 1/1981 | Japan ............ 350/335 |
| 0201218 | 10/1982 | Japan ............ 350/335 |
| 2065321 | 6/1981 | United Kingdom . |
| 2092769 | 8/1982 | United Kingdom . |
| 82/03468 | 10/1982 | World Int. Prop. O. . |

OTHER PUBLICATIONS

Abstract; vol. 6, No. 38 (P-105), Mar. 9, 1982; Liquid-Crystal Display Device #56-156816 (A).

*Primary Examiner*—Stanley D. Miller
*Assistant Examiner*—Anita Pellman Gross

[57] ABSTRACT

A liquid-crystal display device includes a multi-layered-type liquid-crystal cell that is composed of at least first and second cell layers. These cells contain liquid-crystal molecules with a twisted nematic orientation, wherein the angle of twist of the liquid-crystal molecules in the first cell layer is opposite to that of twist of the liquid-crystal molecules in the second cell layer. The orientation of the liquid-crystal molecules in the first cell layer in the vicinity of the second cell layer is at an angle of 70° to 150° to that of the liquid-crystal molecules in the second cell layer in the vicinity of the first cell layer such that this angle is the angle between a director in one cell aligned with the surface of its base substrate (parallel alignment) and the corresponding director in the other cell when it is also of parallel alignment wherein these two directors are horizontally coplanar, the first cell layer has a voltage-applying device that changes the orientation of the liquid-crystal molecules within the first cell layer, but this voltage-applying device does not cause the second cell layer to change orientation of the liquid-crystal molecules within it.

18 Claims, 5 Drawing Sheets

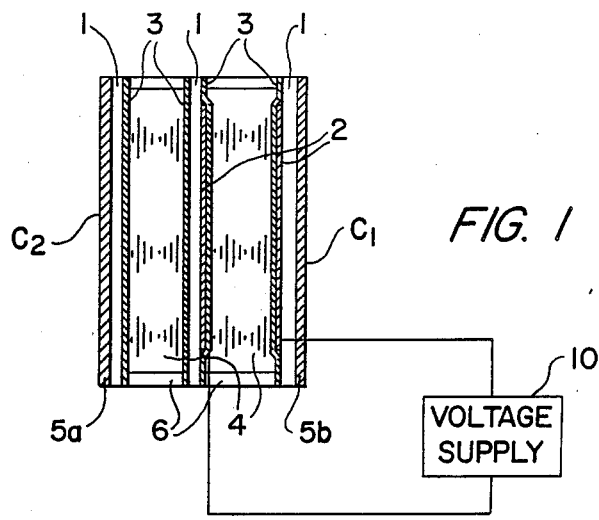
FIG. 1
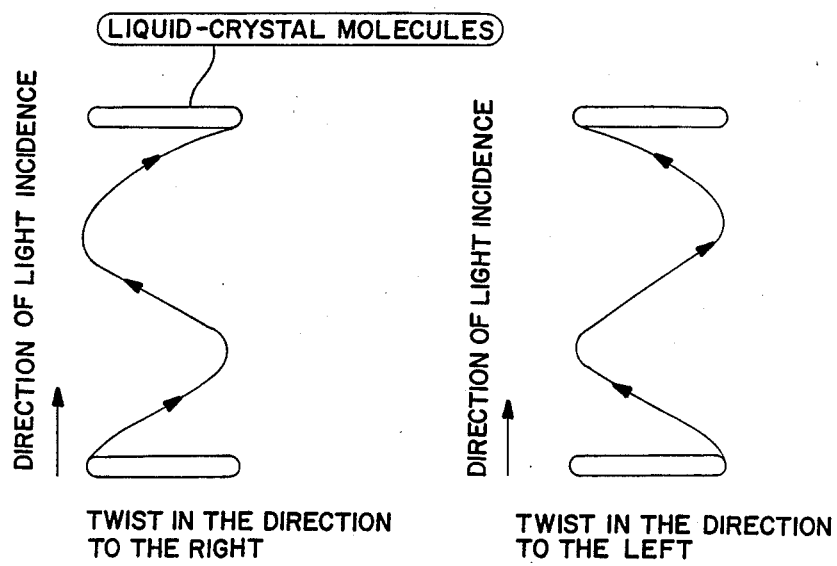
FIG. 2a
FIG. 2b

LIQUID-CRYSTAL DISPLAY DEVICE USING TWISTED NEMATIC LIQUID CRYSTAL MOLECULES

BACKGROUND OF THE INVENTION

1. Field of the Invention

The present invention relates to a multi-layered-type liquid-crystal display device which uses a twisted nematic display process that can produce a black-and-white display image and a colored display image with high contrast.

2. Description of the Prior Art

Liquid-crystal display devices are now being used in clocks electronic calculating machines, computer terminals, word processor displays, televisions, and in a variety of other display devices in many fields. Recently, there has been an extremely large demand for liquid-crystal display devices because of the changes to multicolor and full-color displays, which are already being used in the fields of graphic display and image display. These color displays use a liquid-crystal cell with color filter layers. The liquid-crystal cell functions as a light-switch and produces various colors. The main kind of display mode is a twisted nematic (TN) display mode attained by a liquid-crystal cell in which the liquid-crystal molecules are twisted 90° so that high contrast, etc., can be obtained. However, by using this TN display mode, the dependence of the display characteristics on the wavelength of light is great, and it is not possible to achieve uniform switching of light over the entire spectrum of visible light. In particular, when the normally closed display process has the axes of absorbance of the two polarizers in parallel, there is the problem that light leakages at the time of the application of zero voltage gives rise to color.

There are two kinds of driving methods to drive a TN color display device that utilizes light-switching this kind of a color filter layer, there are two main. One of these methods involves the active-matrix drive method that uses a liquid-crystal cell having picture elements provided with non-linear devices such as diodes or switching elements such as thin-film transistors. The other method involves the multiplex drive method in which the liquid crystals of a liquid-crystal cell having no picture elements are successively driven. With the latter method, the steepness in the vicinity of the threshold value of the optical characteristics of the liquid crystals is important. This characteristic is a problem with the TN displays that are being used now. In order to improve the optical characteristics so that the proper steepness in the vicinity of the threshold value can be attained, there has been suggested a supertwisted birefringence effect (SBE) process that causes liquid-crystal molecules to be twisted at angles of around 180°–270°. With the SBE process, the curve in the vicinity of the threshold value increases sharply such that even when the duty ratio increases, it is possible to obtain a high contrast ratio. However, because birefringence effects of liquid crystals are used, the dependence of the display characteristics on the wavelength is theoretically higher than with the typical TN display, thereby making it very difficult for use in a full-color display.

SUMMARY OF THE PRESENT INVENTION

The liquid-crystal display device of this invention, which overcomes the above-discussed and numerous other disadvantages and deficiencies of the prior art, comprises a multi-layered-type liquid-crystal cell that is composed of at least first and second cell layers, said cell containing liquid-crystal molecules with a twisted nematic orientation therein, wherein the angle of twist of the liquid-crystal molecules in the first cell layer is opposite to that of twist of the liquid-crystal molecules in the second cell layer, and the orientation of the liquid-crystal molecules in the first cell layer in the vicinity of the second cell layer is at an angle of 70° to 150° to that of the liquid-crystal molecules in the second cell layer in the vicinity of the first cell layer, such that this angle is the angle between a director in one cell aligned with the surface of its base substrate (parallel alignment) and the corresponding director in the other cell when it is also of parallel alignment wherein these two directors are horizontally coplanar. In other words, the liquid-crystal molecules in the first cell layer has a first orientation with respect to the surface closest to the second cell layer, and the liquid crystal molecules in the second cell layer has a second orientation with respect to the surface closest to the first cell layer. The first cell layer also has a voltage-applying device connected which changes the orientation of the liquid-crystal molecules therein. This voltages device does not cause a change in the the orientation of the liquid-crystal molecules in the second cell layer.

In a preferred embodiment, the orientation of the liquid-crystal molecules in the first cell layer in the vicinity of the second cell layer is at an angle of 70° to 80° or 110° to 150° to that of the liquid-crystal molecules in the second cell layer in the vicinity of the first cell layer.

In a more preferred embodiment, the orientation of the liquid-crystal molecules in the first cell layer in the vicinity of the second cell layer is at an angle of 120° to 150° to that of the liquid-crystal molecules in the second cell layer in the vicinity of the first cell layer.

In a preferred embodiment, the angle of twist of the liquid-crystal molecules in each of the first and second cell layers is in the range of 180° to 360°.

In a preferred embodiment, the angles of twist of the liquid-crystal molecules in the first and second cell layers are nearly equal to each other, and the product $\Delta n_1 \cdot d_1$ of the birefringence $\Delta n_1$ and the thickness $d_1$ of the liquid-crystal layer in the first cell layer and the product $\Delta n_2 \cdot d_2$ of the birefringence $\Delta n_2$ and the thickness $d_2$ of the liquid-crystal layer in the second cell layer are represented by the following inequality:

$$0.7 \cdot \Delta n_2 \cdot d_2 < \Delta n_1 \cdot d_1 < 1.4 \cdot \Delta n_2 \cdot d_2$$

In a preferred embodiment, the relationship between the pitch p of twist of the liquid-crystal molecules in the cell layer that has the voltage-applying means therein and the thickness d of the liquid-crystal layer in the cell layer is as follows:

$$\theta/2\pi - \tfrac{1}{4} < d/p \leq \theta/2\pi.$$

wherein $\theta$ is the angle of twist of the liquid-crystal molecules.

In a preferred embodiment, a color filter layer is disposed in at least one of the first and second cell layers.

In a preferred embodiment, an active device is disposed on each picture element in at least one of the first and second cell layers.

Thus, the invention described above makes possible the objectives of (1) providing a liquid-crystal display device that produces a black-and-white display image and a colored display image with superior color reproducibility and high contrast; and (2) providing a liquid-crystal display device that attains a full-color display or a multi-color display.

BRIEF DESCRIPTION OF THE DRAWINGS

This invention may be better understood and its numerous objects and advantages will become apparent to those skilled in the art by reference to the accompanying drawings as follows:

FIG. 1 is a sectional view showing the fundamental cell structure of a multi-layered-type liquid-crystal display device of this invention.

FIGS. 2a and 2b, respectively, are diagrams showing twists of liquid-crystal molecules in the right and left directions.

DESCRIPTION OF THE PREFERRED EMBODIMENTS

Figure 3:
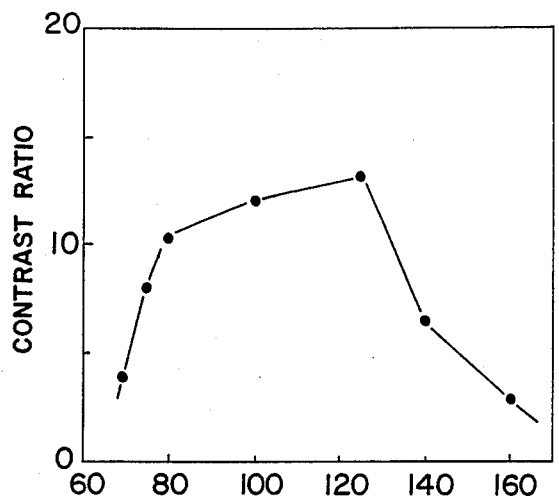
FIG. 3 is of a characteristic curve showing the relationship between the angle of the orientation of the liquid-crystal molecules in the first cell layer in the vicinity of the second cell layer to the orientation of the liquid-crystal molecules in the second cell layer in the vicinity of the first cell layer and the contrast ratio.

The present invention provides a liquid-crystal display device, the fundamental double-layered cell structure of which is, as shown in FIG. 1, composed of a first cell layer $C_1$ and a second cell layer $C_2$ that contains liquid-crystal molecules therein with a twisted nematic orientation. Each cell layer comprises transparent substrates 1 of glass, acrylic resins, or the like; transparent conductive films 2 of ITO, nesa film, or the like positioned on the substrate 1, and orientation films 3 of inorganic film made of $SiO_2$, SiO, or the like or an organic film made of polyimide, polyvinyl alcohol, nylon, acrylic resins, or the like for the orientation of liquid-crystal molecules positioned on the substrates 1 and the transparent conductive films 2. A polarizer 5a is positioned on the back face of the substrate 1 of the second cell layer $C_2$ and a detector 5b is positioned on the back face of the substrate 1 of the first cell layer $C_1$. Both ends of each cell layer are sealed by sealing substances 6. A liquid-crystal layer 4 is disposed in each of the cell layers $C_1$ and $C_2$.

The direction in which the liquid-crystal molecules of the liquid-crystal layer 4 in one cell layer are helically twisted is opposite to the direction in which the liquid-crystal molecules of the liquid-crystal layer 4 in the other cell layer. The directions of twist of the liquid-crystal molecules are set as shown in FIGS. 2a and 2b in which FIG. 2a shows the twist of the liquid-crystal molecules in the right direction with regard to the direction in which light from a light source is incident upon the cell and FIG. 2b shows twist of the liquid-crystal molecules in the left direction with regard to the light incidence direction. When an optically active substance is added to a nematic liquid crystal, the liquid-crystal molecules form a twisted structure. To cause the liquid-crystal molecules to give rise to a twist in the right direction, the substance that is represented by the following chemical structure is used as an optically active substance:

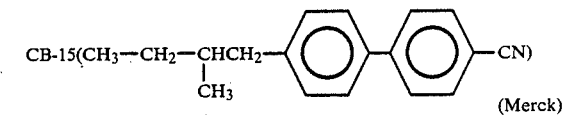

CB-15(CH$_3$—CH$_2$—CHCH$_2$— ... —CN)
      |
      CH$_3$
                                    (Merck)

To cause the liquid-crystal molecules to give rise to a twist in the left direction, cholesteryl nonanoate (Merck), S-811 (Merck), etc., are used as optically active substances.

Voltage is applied via voltage supply 10 to the liquid-crystal layer 4 of the first cell layer $C_1$ via the transparent conductive films 2, so that the orientation (director 11 of FIG. 8) of the liquid-crystal molecules of the first cell layer $C_1$ can be changed. Because no transparent conductive films 2 are disposed on the liquid-crystal layer 4 of the second cell layer $C_2$, changes to the orientation (director 12 of FIG. 8) of the liquid-crystal molecules of the second cell layer $C_2$ do not occur. The second cell layer $C_2$ functions as a compensator that makes the display pattern of the first cell layer $C_1$ distinct.

FIG. 3 shows the relationship between the angles (this angle is clearly shown by angle 13 of FIG. 8) of the orientation of the liquid-crystal molecules of the first cell layer $C_1$ in the vicinity of the second cell layer $C_2$ to the orientation of the liquid-crystal molecules of the second cell layer $C_2$ in the vicinity of the first cell layer $C_1$ and the contrast ratio, wherein the angles $\theta_1$ and $\theta_2$ of twist of the liquid-crystal molecules of the liquid-crystal layers in the first and second cell layers $C_1$ and $C_2$ are set as follows: $\theta_1 = \theta_2 = 270°$, and the values $\Delta n_1 \cdot d_1$ and $\Delta n_2 \cdot d_2$ ($\Delta n_1$ and $\Delta n_2$ being the birefringence of the liquid crystals in the first and second cell layers, respectively, and $d_1$ and $d_2$ being the thicknesses of the liquid-crystal layers in the first and second cell layers, respectively) of the liquid-crystal layers in the first and second cell layers are set as follows: $\Delta n_1 \cdot d_1 = \Delta n_2 \cdot d_2 = 0.7$ It can be seen from FIG. 3 that the value of $\alpha$ should be set to be 70° to 150° in order to obtain a contrast ratio that is ½ times or more the maximum contrast ratio.

When the value of $\alpha$ is in the range of 70° to 80° or 100° to 150°, because of the birefringence of the liquid-crystal in the second cell layer, the first cell layer attains a high transmittance of light at the time of the application of zero voltage and attains a low transmittance of light at the time of the application of voltage; namely, the first cell layer attains a positive-type display. When the value of $\alpha$ is in the range of 80° and 100°, the first cell layer attains an opposite phenomenon, that is, a negative-type display.

Since it is desirable that reflection-type liquid-crystal display devices attain a positive-type display, the value of $\alpha$ should be set to be 70°-80° or 100°-150°. It is preferably set to be 120°-150° in light of the readiness of the manufacture thereof.

The liquid-crystal layers of this invention are constructed so that the following relationship can be satisfied because the maximum contrast ratio exists therein:

$$0.7 < (\Delta n_1 \cdot d_1 \cdot \theta_2)/(\Delta n_2 \cdot d_2 \cdot \theta_1) < 1.5$$

Figure 4:
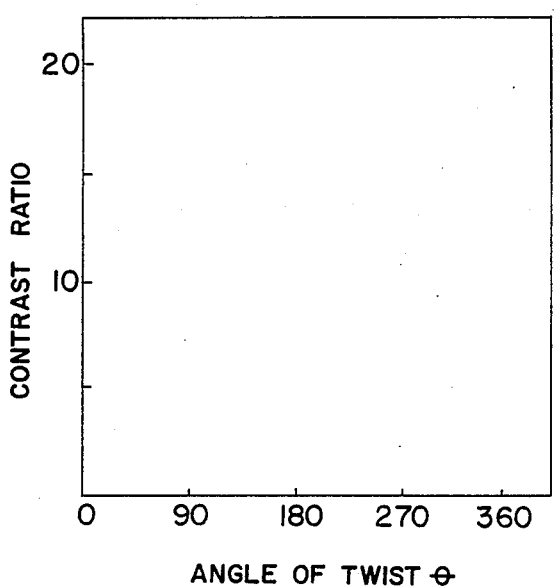
FIG. 4 is of a characteristic curve showing the relationship between the angle of twist of liquid-crystal molecules and the contrast ratio of display images.

By considering the display contrast and the visibility, as shown in FIG. 4, the angle of twist of the liquid-crystal molecules is preferably set to be in the range of about 180° to about 360° based on the relationship between the angle of twist and the contrast ratio. If the angle of twist of the liquid-crystal molecules exceeds 360°, a domain appears in which the liquid crystals have their orientation disarrayed at the time of the application of voltage, resulting in a dispersion of light, which readily gives rise to a decrease in contrast.

Figure 5:
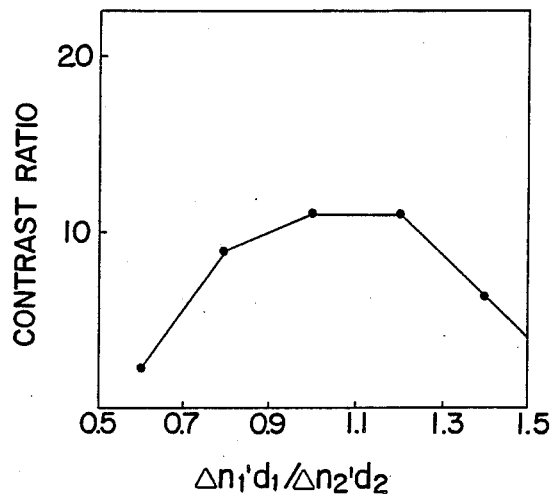
FIG. 5 is of a characteristic curve showing the relationship between the value of $\Delta n_1 \cdot d_1 / \Delta n_2 \cdot d_2$ and the contrast ratio.

FIG. 5 shows the relationship between the value of $(\Delta n_1 \cdot d_1)/(\Delta n_2 \cdot d_2)$ and the contrast ratio, wherein $\alpha = 110°$ and $\theta_1 = \theta_2 = 270°$, indicating that the value of $(\Delta n_1 \cdot d_i)/(\Delta n_2 \cdot d_2)$ should be set to be more than 0.7 and less than 1.4 (i.e., $0.7 < (\Delta n_1 \cdot d_1)/(\Delta n_2 \cdot d_2) < 1.4$) in order to obtain a contrast ratio that is ½ times or more the maximum contrast ratio. The absolute value of each of $\Delta n_1$, $d_1$, $\Delta n_2$, and $d_2$ is preferably set to be in the range of 0.3 to 3.0.

When the liquid-crystal device is driven by the multiplex drive method, to obtain sharp threshold characteristics of contrast, the specific pitch p of the twist of liquid-crystal molecules in the one cell layer with voltage-applying means becomes very important. The ratio of the thickness d of the liquid-crystal layer to the pitch p of the twist of the liquid-crystal molecules, d/p, is preferably set by use of experimental data as follows:

$$\theta/2\pi - \tfrac{1}{4} < d/p \leq \theta/2\pi$$

wherein $\theta$ is the angle of twist of liquid-crystal molecules. This requirement applies in the case where the pretilt angle of the liquid crystals is about 10° or less.

Figure 8:
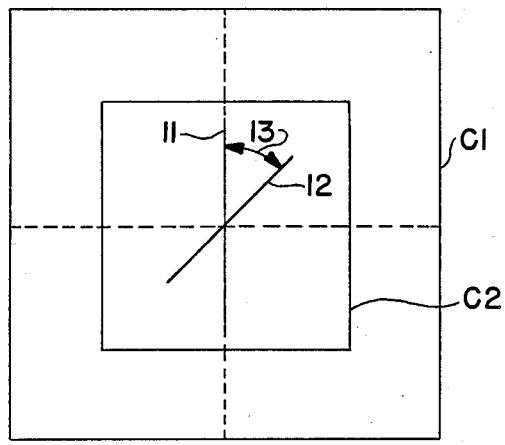
FIG. 8 shows the angle between the orientations of the liquid-crystal molecules in adjacent cell layers at the interface of the cells.

FIG. 8 shows the angle created by the orientation of the liquid-crystal molecules in the cell layers C1 and C2. This figure is drawn from the perspective of looking away from the light source. The orientation of the liquid-crystal molecules in the first cell layer C1 is shown by item 11, whereas the orientation of the liquid crystal molecules in the second cell layer C2 is shown by item 12. The angle generated by these orientations 11 and 12 is shown by item 13. This angle 13 may vary between 70° to 150°.

EXAMPLE 1

Figure 6A:
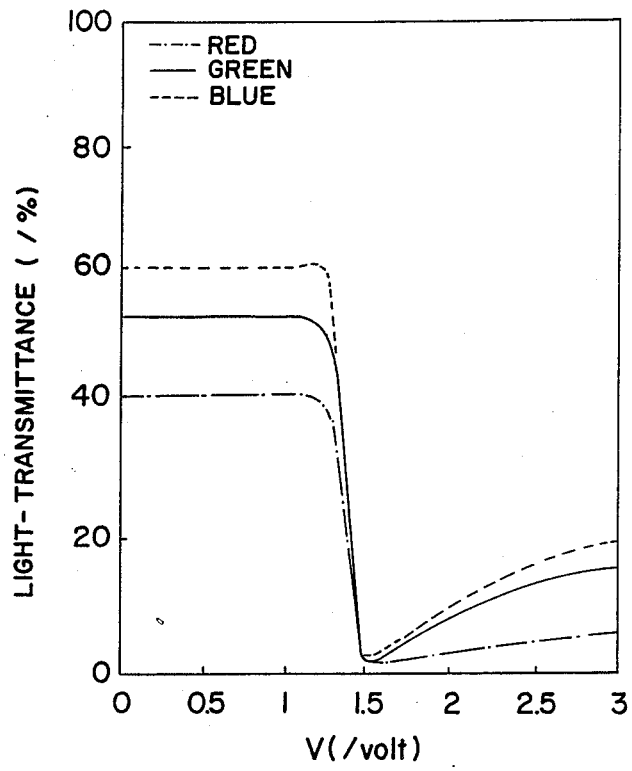
FIG. 6a is of characteristic curves showing the relationship between the applied voltage and the light transmittance with regard to the display device of FIG. 1 of this invention.
Figure 6B:
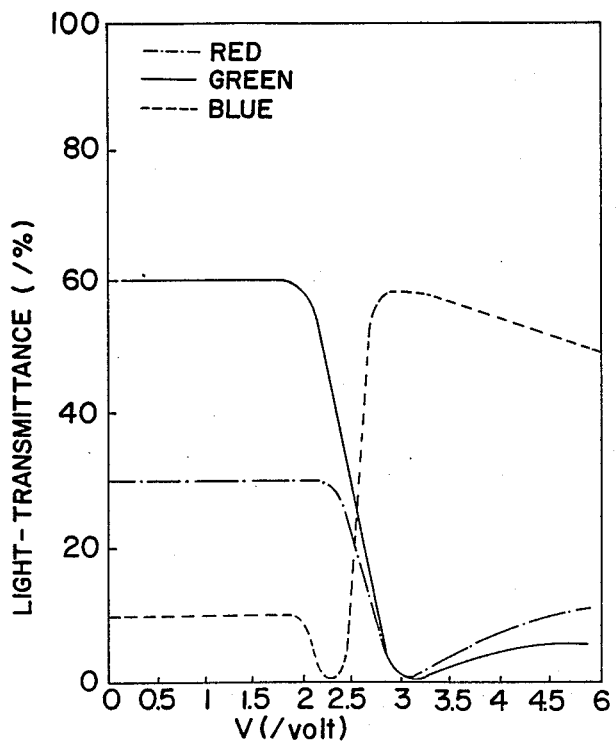
FIG. 6b is of characteristic curves showing the relationship between the applied voltage and the light transmittance with regard to a single-layered type TN-LCD.

FIG. 1 shows the double-layered cell structure of a liquid-crystal display device (i.e., a double-layered-type TN-LCD) of this invention, in which the transparent substrate 1 is made of glass. A transparent conductive film 2 with a thickness of about 1500 Å is disposed only on each of the glass substrates 1 of the first cell layer $C_1$ by vapor deposition of ITO and patterned by an etching technique. On the glass substrates 1 and the transparent conductive films 2, liquid-crystal-molecule orientation films 3 of polyimide are formed with a thickness of about 1000 Å by a spin coating technique, the surfaces of which are treated by being rubbed with cloth, causing the liquid-crystal molecules to be in a twisted nematic orientation. The end portions of the cell layers are sealed by a sealing substance 6. The value of $\alpha$ is set to be 135°. As a liquid-crystal substance, a nematic liquid crystal, ZLI-3281 (Merck), is used. To the liquid-crystal layer 4 of the first cell layer $C_1$, 0.94 wt% of CB15 is added and 1.1 wt% of cholesteryl nonanoate is added to the liquid-crystal layer 4 of the second cell layer $C_2$. The angle of twist of the liquid-crystal molecules in the first cell layer $C_1$ is in the opposite direction to that of the liquid-crystal molecules in the second cell layer $C_2$, wherein $\theta_1 = \theta_2 = 270°$, The thickness of the liquid-crystal layer in each of the first and second cell layers $C_1$ and $C_2$ (i.e., the thickness of each of the cell layers $C_1$ and $C_2$) is 5 µm, i.e., $d_1 = d_2 = 5$ µm. The value of P is about 8 µm. The pretilt angle of the liquid crystals on the substrates 1 is about 8°. The polarizer 5a and the detector 5b, which are made of an iodine-system polarizing board, are placed at an angle of about 45° therebetween. FIGS. 6a and 6b show the dependence of the light transmittance on the applied voltage with regard to the double-layered-type TN-LCD of this invention and a reference standard single-layered-type TN-LCD, respectively, wherein the wavelengths λ used herein for red color, green color, and blue color are 610 nm, 550 nm, and 450 nm, respectively. At the time of the application of a voltage near the threshold value, the transmittance of the wavelength for each color in the double-layered-type cell is lower than that of the wavelength for each color in the single-layered-type cell. This means that the double-layered-type cell can attain high contrast. Moreover, the dependence of the applied-voltage-transmittance characteristics on the wavelengths with regard to the double-layered-type cell is much smaller than that of the applied-voltage-transmittance characteristics on the wavelengths with regard to the single-layered-type cell, and thus, the double-layered-type cell can produce a distinct black-and-white display image of a positive-display type.

EXAMPLE 2

Figure 7A:
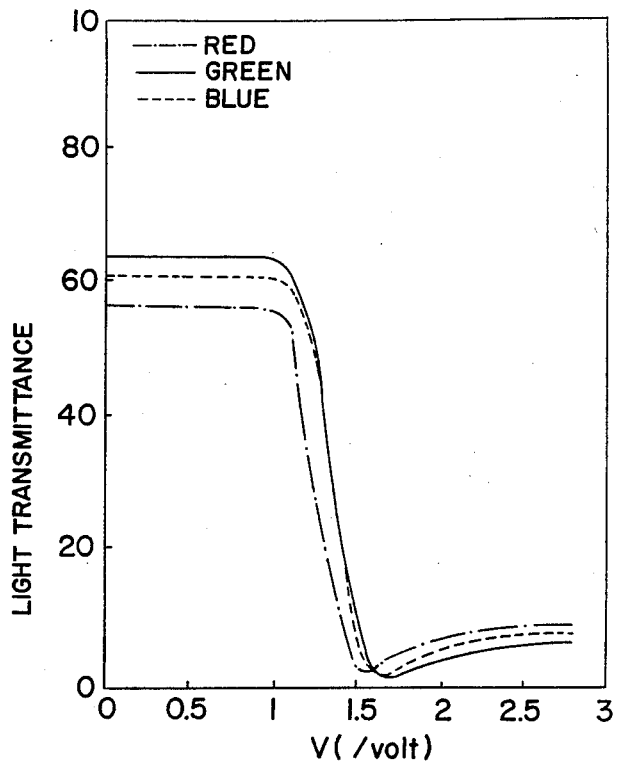
FIG. 7a is of characteristic curves showing the relationship between the applied voltage and the light transmittance with regard to another multi-layered display device of this invention.
Figure 7B:
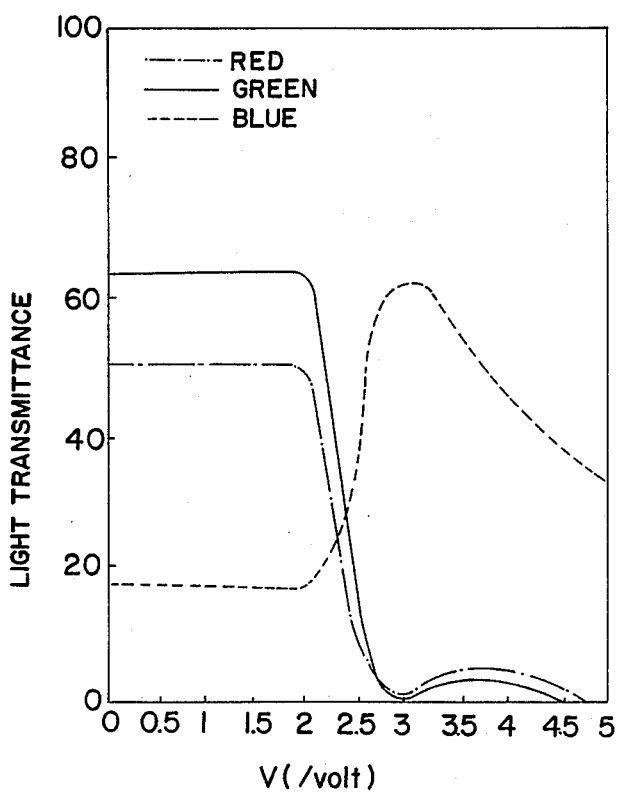
FIG. 7b is of characteristic curves showing the relationship between the applied voltage and the light transmittance with regard to another single-layered type TN-LCD.

This example provides another liquid-crystal display device of the present invention, which has the same structure as that of Example 1, except that 0.75 wt% of CB15 is added to the liquid-crystal layer 4 of the first cell layer $C_1$ and 0.84 wt% of cholesteryl nonanoate is added to the liquid-crystal layer 4 of the second cell layer $C_2$, and moreover the angles $\theta_1$ and $\theta_2$ of twist of the liquid-crystal molecules in the first and second cell layers $C_1$ and $C_2$ are set to the value of 240°, respectively (i.e., $\theta_1 = \theta_2 = 240°$). FIG. 7a shows the dependence of the light transmittance on the applied voltage with regard to the double-layered type TN-CLD of this invention and FIG. 7b shows the same characteristics as mentioned above with regard to a reference standard single-layered-type TN-CLD, wherein the wavelengths λ examined herein are 610 nm for red, 550 nm for green, and 450 nm for blue. FIGS. 7a and 7b indicate that the transmittance characteristics of the wavelengths for red, green, and blue in the double-layered-type cell are more uniform than those of the wavelengths in the single-layered-type cell, so that a distinct black-and-white display image of the positive-display type can be attained. Moreover, the double-layered-type cell has sharp threshold characteristics, so that the said cell can produce a display image with high contrast.

EXAMPLE 3

Inside the liquid-crystal cell layer with voltage-applying means of each of the display devices in the above-mentioned examples, color (red, green, and blue) filter layers of a gelatin film are disposed. The display devices with the color filter layers are subjected to a multiplex drive, with the formation of a distinct, clear color image. These liquid-crystal display devices are useful for full-color display and multi-color display.

EXAMPLE 4

The liquid-crystal cells of the present invention are used in place of a liquid-crystal panel with color filters that is provided with a TFT (Thin Film Transistor) as an active device, and are examined for color display tests by an active matrix drive. They produce a distinct and clear color image, so they are useful for full-color display and multi-color display.

Although the above-mentioned examples only disclose double-layered-type liquid-crystal display devices, this invention is, of course, applicable to multi-layered-type liquid-crystal display devices including triple-, tetra-, and hexa-layered-type liquid-crystal display devices.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid-crystal display device comprising:
    a multi-layer-type liquid-crystal cell that is composed of at least first and second cell layers, said cell layers containing liquid-crystal molecules with a twisted nematic orientation therein;
    said first cell layer having an angle of twist of said liquid-crystal molecules opposite to an angle of twist of the liquid-crystal molecules in said second cell layer;
    said liquid-crystal molecules in said first cell layer in the vicinity of said second cell layer having a first orientation; and
    said liquid-crystal molecules in said second cell layer in the vicinity of said first cell layer having a second orientation;
    said first and second orientation forming an angle which varies between 70° to 80° or 110° to 150°; and
    voltage-applying means, operatively connected to said first cell layer, for applying a voltage to said first cell layer to vary said first orientation of said liquid-crystal molecules;
    said second orientation of said liquid-crystal molecules in said second layer cell not being varied by said voltage applying means.

2. A liquid-crystal display device as claimed in claim 1, wherein said angle created by said first and second orientation is of 120° to 150°.

3. A liquid-crystal display device as claimed in claim 2, wherein said angle of twist of said liquid-crystal molecules in each of said first and second cell layers is in a range of 180° to 360°.

4. A liquid-crystal display device as claimed in claim 3, wherein a color filter layer is disposed in at least one of said first and second cell layers.

5. A liquid-crystal display device as claimed in claim 3, wherein said first and second cell layers include picture elements and an active device is disposed on each picture element in at least one of said first and second cell layers.

6. A liquid-crystal display device as claimed in claim 2, wherein a color filter layer is disposed in at least one of said first and second cell layers.

7. A liquid-crystal display device as claimed in claim 2, wherein said first and second cell layers include picture elements and an active device is disposed on each picture element in at least one of said first and second cell layers.

8. A liquid-crystal display device as claimed in claim 1, wherein said angle of twist of said liquid-crystal molecules in each of said first and second cell layers is in a range of 180° to 360°.

9. A liquid-crystal display device as claimed in claim 8, wherein a color filter layer is disposed in at least one of said first and second cell layers.

10. A liquid-crystal display device as claimed in claim 8, wherein said first and second cell layers include picture elements and an active device is disposed on each picture element in at least one of said first and second cell layers.

11. A liquid-crystal display device as claimed in claim 1, wherein said angles of twist of said liquid-crystal molecules in said first and second cell layers are substantially equal to each other, and a product $\Delta n_1 \cdot d_1$ of a birefringence $\Delta n_1$ and a thickness $d_1$ of the liquid-crystal material in said first cell layer and a product $\Delta n_2 \cdot d_2$ of a birefringence $\Delta n_2$ and a thickness $d_2$ of the liquid-crystal material in said second cell layer are governed by:

$$0.7 \cdot \Delta n_2 \cdot d_2 < \Delta n_1 \cdot d_1 \leq 1.4 \cdot \Delta n_2 \cdot d_2 .$$

12. A liquid-crystal display device as claimed in claim 11, wherein a color filter layer is disposed in at least one of said first and second cell layers.

13. A liquid-crystal display device as claimed in claim 11, wherein said first and second cell layers include picture elements and an active device is disposed on each picture element in at least one of said first and second cell layers.

14. A liquid-crystal display device as claimed in claim 1, wherein a relationship between a pitch p of the twist of said liquid-crystal molecules in said first cell layer and a thickness d of the liquid-crystal material in said first cell layer is as follows:

$$\theta/2\pi - \tfrac{1}{4} < d/p \leq \theta/2\pi$$

wherein θ is said angle of twist of said liquid-crystal molecules.

15. A liquid-crystal display device as claimed in claim 14, wherein a color filter layer is disposed in at least one of said first and second cell layers.

16. A liquid-crystal display device as claimed in claim 14, wherein said first and second cell layers include picture elements and an active device is disposed on each picture element in at least one of said first and second cell layers.

17. A liquid-crystal display device as claimed in claim 1, wherein a color filter layer is disposed in at least one of said first and second cell layers.

18. A liquid-crystal display device as claimed in claim 1, wherein said first and second cell layers include picture elements and an active device is disposed on each picture element in at least one of said first and second cell layers.

* * * * *

UNITED STATES PATENT AND TRADEMARK OFFICE
CERTIFICATE OF CORRECTION

PATENT NO. : 4,941,737

DATED : July 17, 1990

INVENTOR(S) : Naofumi Kimura

It is certified that error appears in the above-identified patent and that said Letters Patent is hereby corrected as shown below:

In the drawings, sheet 2, replace Figure 4 with the following corrected Figure 4 as shown on the attached sheet.

Signed and Sealed this

Twenty-fourth Day of September, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,941,737
DATED : July 17, 1990
INVENTOR(S) : Naofumi Kimura

It is certified that error appears in the above-identified patent and that said Letters Patent is hereby corrected as shown below:

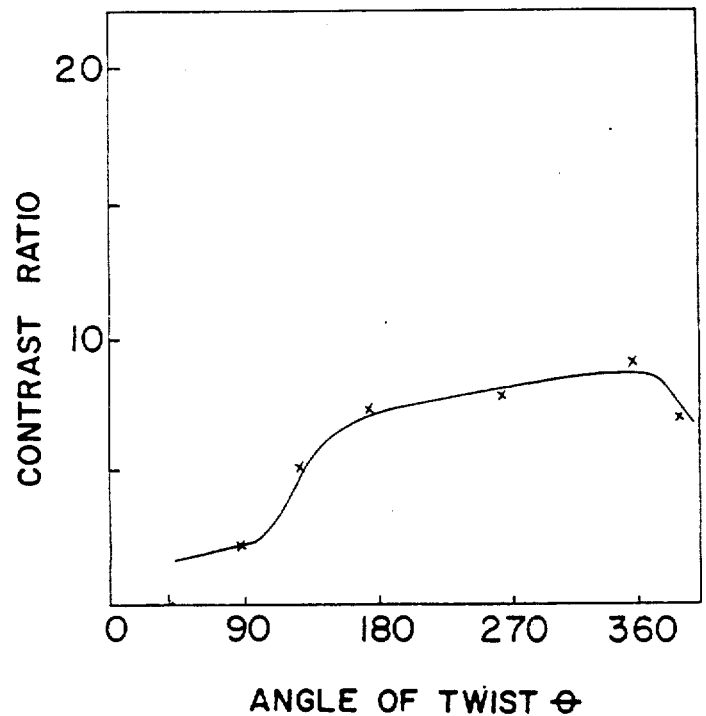

FIG. 4